June 12, 1934.   H. C. WELLMAN   1,962,373
FILM WINDING MECHANISM
Filed Aug. 21, 1931

Inventor:
Howard C. Wellman,
By
Attorneys.

Patented June 12, 1934

1,962,373

UNITED STATES PATENT OFFICE 1,962,373

FILM WINDING MECHANISM

Howard C. Wellman, Rochester, N. Y., assignor to Eastman Kodak Company, Rochester, N. Y., a corporation of New York Application August 21, 1931, Serial No. 558,537

3 Claims. (Cl. 242—70)

This invention relates to photography and more particularly to motion picture apparatus.

One object of my invention is to provide a simple, inexpensive, and satisfactory driving connection between a reel supporting hub and a reel adapted to receive film.

Another object of my invention is to provide a simple type of reel which can be easily and quickly placed in position on the winding hub of a motion picture film machine.

Another object of my invention is to provide a hub with relatively few parts which will form a driving connection with a film reel and which is provided with a latched mechanism to retain a film reel in the proper position.

Still other objects will appear from the following specification, the novel features being particularly pointed out in the claims at the end hereof.

Coming now to the drawing wherein like reference characters denote like parts throughout;

Figure 1:
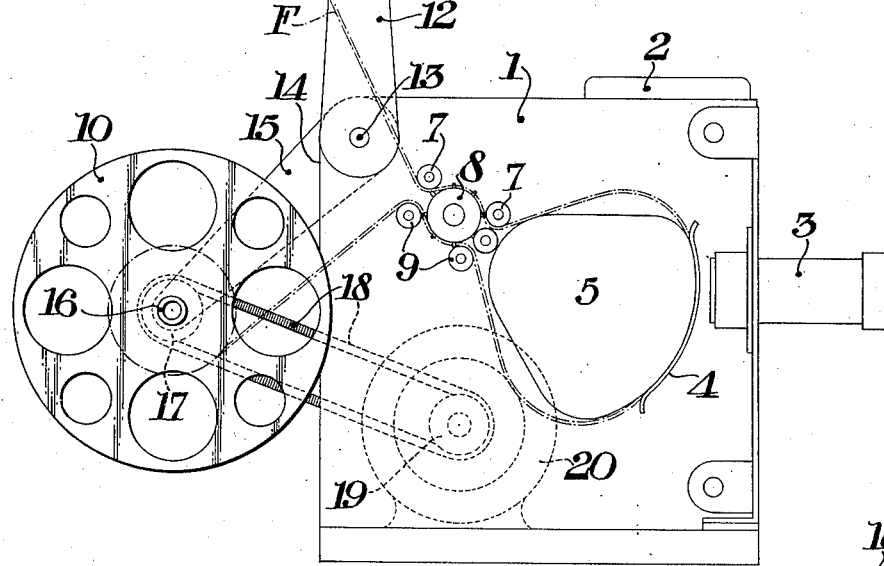
Fig. 1 is a side elevation of a motion picture projector equipped with film winding mechanism constructed in accordance with and embodying a preferred form of my invention.

In order to illustrate my invention, I have shown a preferred form used in connection with a projector in Fig. 1, although of course, the winding and reeling device is equally suitable for other motion picture apparatus, such as cameras.

In Fig. 1 there is diagrammatically shown a projector which may be equipped with the usual lamphouse 2, objective 3, film gate 4, and housing 5, which may contain the intermittently actuated film-moving mechanism. A film F may be led from a supply reel 6 past guide rollers 7 which hold the film on a sprocket 8, through the film gate 4 past guide rolls 9 which also hold the film on the sprocket 8, and to a take-up reel 10.

The supply reel 6 may be mounted on a shaft 11 carried by an arm 12 which may be attached at 13 to an upstanding plate 14 which supports the mechanism of the projector 1. A second arm 15 is provided with a hub 16 which will be hereafter more fully described, since it differs from hub 11 in that it is provided with a driving and latching means to retain a film reel in the proper position.

The hub may be rotated by power as by a pulley 17 which may be rotated by a belt 18 driven by pulley 19 of a motor 20. The motor is also adapted to drive the sprocket 8 and the intermittent film-moving mechanism in the housing 5 by means of well-known connections.

Figure 3:
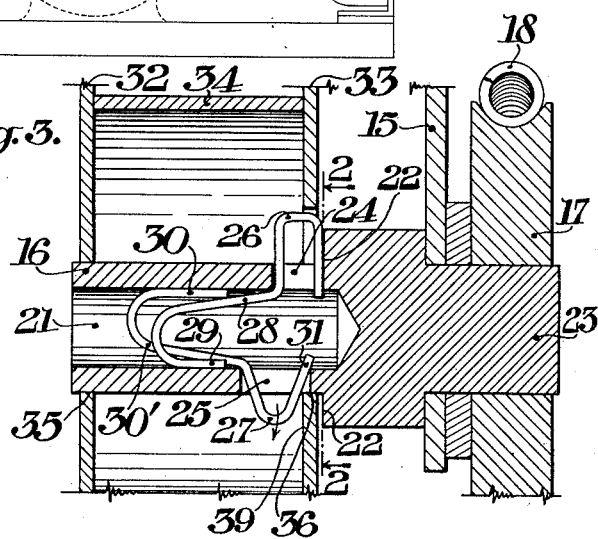
Fig. 3 is an enlarged detail in section to a winding hub and reel, showing a preferred form of my invention.

The hub 16, as best shown in Fig. 3, may consist of an outer cylindrical member 21 terminating in a shoulder 22 from which a shaft 23 extends into and is attached to a pulley 17. This is the pulley shown in Fig. 1 which may be driven by a belt 18.

The cylindrical portion of the hub 16, that is, portion 21, is provided with a pair of apertures 24 and 25. These apertures are preferably spaced axially of the hub, and they are also preferably arranged diametrically opposite to each other. One aperture 24 lies adjacent to the shoulder 22, and the other aperture 25 is preferably placed a slight distance from this shoulder.

Two lugs 26 and 27 extend through the apertures 24 and 25, lug 26 serving as a key for driving a film reel, and lug 27 serving as a latched member to hold a reel in place. Lug 26 may consist of a U-shaped member preferably formed on the end of a bent wire 28, the opposite end of which 29 retains lug 26 firmly in the position shown in Fig. 3. Lug 27 may also be conveniently made of bent wire, and that portion 30' which lies in the cylindrical portion of the hub 21 is preferably quite resilient so that the end 30 tends to exert an outward thrust on the lug 27 in the direction shown by the arrow. Since the lug 27 is V-shaped, the shoulders 31 limit the outward movement of the lug 27 by striking the edges of the aperture 25.

Lug 26 differs from 27 in that the sides of the U-shaped portion engage the edges of the aperture 24 and the lug 26 does not, therefore, move freely through the aperture 24 but is held erect in the position shown.

I provide a special type of film reel for use with the winding hub 16 described above. The film reel may consist of the usual spaced flanges 32 and 33, these flanges being connected by a core 34 which may be formed conveniently of rolled-up sheet metal.

Each of the flanges 32 and 33 has central apertures 35 and 36. Apertures 35 and 36 are of the same diameter, but one flange 33 has a plurality of notches 37 extending away from the aperture 36, whereas in flange 32 the aperture is unnotched.

Figure 2:
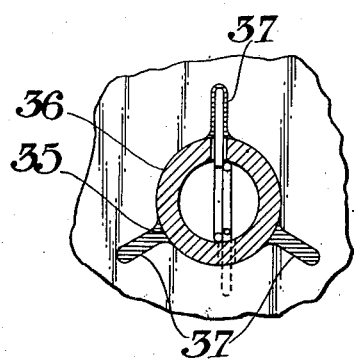
Fig. 2 shows an enlarged fragmentary detailed view, partially in section, taken on line 2—2 of Fig. 3.

As shown in Fig. 2, I prefer to provide a series of notches 37 which are preferably equally spaced apart but are so arranged that no two notches are spaced diametrically opposite to each other.

The reason for this is that since the lugs 26 and 27 are spaced diametrically opposite to each other, the notches 37 must be arranged in some other pattern, because if two notches 37 were opposite to each other, the latch 27 would not function in the manner which will now be described.

When an operator desires to place a reel on the take-up hub 16 in position to be rotated by power, the flange 33 of the reel is first slid over the end of the hub 16. By turning the reel until a notch 37 comes opposite the driving lug 26, the reel can be then further moved axially of the hub 16 until the smooth periphery of the aperture 36 opposite the notch 37 will engage the latch formed by the lug 27, so that the reel will be firmly latched in position with a notch 37 in engagement with the driving lug 26.

Being quite resilient, the V-shaped latch 27 will be depressed into the hollow portion 21 of the drive hub 16 as the reel slides axially along the hub, and then when the reel is in the position shown in Fig. 3, the lug 27 will spring to the position shown in this figure, wherein it engages an inner edge 39 of flange 33 and thus retains the reel at position.

While I have shown my reel as being provided with three notches 37, any odd number of notches can be used. One notch would be sufficient, but where only one notch is used, it may be necessary to turn the reel to almost 360° to register the notch with the driving lug 26. As the number of notches increase, the number of degrees it is necessary to turn the reel to register a notch with the driving lug 26 correspondingly decrease.

Three notches has been found most convenient, since it neither weakens the reel nor requires much turning to position it on the driving hub.

While I have described and illustrated in the drawing a preferred form of my invention, I contemplate as within the scope of my invention all such forms as may come within the terms of the appended claims.

What I claim is:

1. A winding and reeling device for motion picture apparatus in combination, a shouldered cylindrical hub member, two lugs extending from the periphery of the hub member forming a reel driving lug and a reel latching lug, at least one lug being resilient, and a film reel adapted to be mounted on the hub and including a pair of spaced apertured flanges, the aperture in one of said flanges being provided with a notch adapted positively to engage said driving lug and having a smooth unnotched portion adapted to engage and be located by said latching lug.

2. A winding and reeling device for motion picture apparatus comprising in combination, a shouldered cylindrical hub member, two lugs extending from the periphery of the hub member forming a reel driving lug and a reel latching lug, a resilient support for the reel latching lug, the two lugs being located in the hub diametrically opposite to each other and lying toward the same end of the hub but spaced axially along said hub, and a film reel adapted to cooperate with said hub comprising spaced apertured flanges, one flange being provided with a plurality of notches angularly spaced from each other at less than 180°, whereby one notch may engage the reel driving lug, and the reel locating lug may engage a smooth unnotched portion of the aperture in said flange.

3. A winding and reeling device for motion picture apparatus including a hub, said hub having a shoulder and a hollow cylindrical member provided with a pair of axially spaced apertures on opposite sides, a pair of lugs extending through the apertures, one lug including a spring having a tapered portion extending through an aperture and adapted to form a snap latch and the other lug lying adjacent said shoulder and being adapted to form a key for driving a film reel.

HOWARD C. WELLMAN.